United States Patent

Bristol

[11] 3,714,952

[45] Feb. 6, 1973

[54] METHOD AND APPARATUS FOR COMPENSATORY CONTROL OF INTERACTING PROCESS VARIABLES

[75] Inventor: Edgar H. Bristol, II, Foxboro, Mass.

[73] Assignee: The Foxboro Company, Foxboro, Mass.

[22] Filed: March 24, 1971

[21] Appl. No.: 127,722

[52] U.S. Cl. ............................................. 137/1
[51] Int. Cl. .................................... G05b 13/00
[58] Field of Search......... 137/85, 82, 1, 14, 3, 4, 5

[56] References Cited

UNITED STATES PATENTS

1,921,145  8/1933  Albright ............................. 137/3

*Primary Examiner* — Alan Cohan
*Attorney* — Lawrence H. Poeton

[57] ABSTRACT

When process valves reach their limits, a special control problem arises because the valve limit then effectively introduces a discontinuity in control behavior. An approach is taken for improved control of a process having interacting variables wherein valve controllers are connected directly to valves which in turn are in control of the process controlled variables. Compensation means for the process interacting variables processes the process measurements and set points either separately, in one version, or in an integrated fashion, in another version, providing compensated error signals to the respective process controllers. In this manner, saturation of a valve affects only its process controlled variable, and the limit discontinuity is restricted in its adverse effect, thereby providing improved control under conditions of process saturations.

8 Claims, 3 Drawing Figures

METHOD AND APPARATUS FOR COMPENSATORY CONTROL OF INTERACTING PROCESS VARIABLES

BACKGROUND OF THE INVENTION

Processes having a plurality of interacting variables present difficult control situations, in that the control of each variable is in fact modified by the behavior of some other variable or variables. It is conventional to augment the control scheme in such processes with compensators behaving as an inverse of the process itself. Thereby the measurement representing a particular controlled variable produces a controller response which is compensated by subtracting the behavior of the remaining loops of the process so that the compensated controller output in effect is restricted to the loop being controlled.

A special problem arises when a process valve reaches its limit. Such an occurence effectively alters the desired control parameters. One approach to this problem would be to switch compensators upon the occurrence of a valve reaching its limit. The invention directs itself to an approach wherein each process controller output is always directly connected to its respective valve, with compensation being effected upon process measurements and set points. This approach eliminates the more adverse saturation effect between the compensator and the process that occurs with a compensated controller output whenever a valve reaches its limit.

Figure 1:
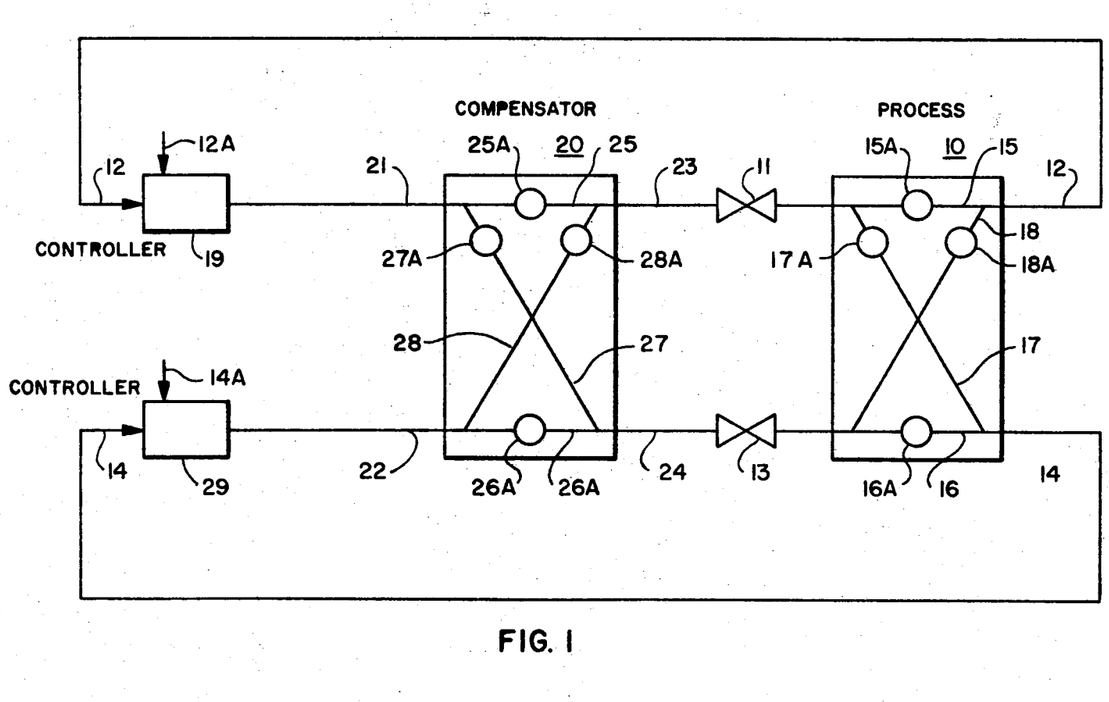
FIG. 1 is a schematic diagram of conventional interacting process variable compensation.

Referring to FIG. 1, the saturating valve control problem is more easily understood by examining a more limited approach to the handling of the interaction of process variables. A process 10 has valves 11 and 13 which affect process measurements 12 and 14 in an interacting manner illustratively represented by process paths 15–18. Actuation of valve 11 affects measurement 12 via process path 15 and in addition affects measurement 14 via process path 17. Similarly, actuation of valve 13 affects measurements 14 and 12 via process paths 16 and 18 respectively. Schematic process paths 15–18 are to be considered as mathematical representations of the interactions within process 10 rather than being indicative of actual process interconnections. The representation of FIG. 1 is a way of showing that manipulation of a process variable, such as by a valve 11, may affect a measurement 12 in a particular manner mathematically represented by dynamic transfer function 15a shown in path 15, and may also affect another measurement 14 in another manner by function 17a shown in path 17. The process interaction is caused by the behavior of functions 17a and 18a in paths 17 and 18 respectively, showing that both measurements 12 and 14 are each in some way affected by manipulation of either valve 11 or 12, as the case may be. For any particular interacting process, the dynamic transfer functions 15a, 16a, 17a, and 18a may be determined by calculation or experimentation. That is to say, the behavior of measurements 12 and 14 as a consequence of process actuation may be established and expressed in a mathematical form. It may be noted that the form used for a predictive model may be based on determining effective functions 15a through 18a, or may more conveniently be a more abstract mathematical expression of the relationship between inputs and interacting outputs, as in a matrix expression. The derivation and calculation of these matrix types of expressions is old and routine in the art.

If the matrix analysis of a process is done, then a convenient way of counteracting process interactions is to calculate an inverse matrix and use this inverse expression to modify the actuation of valves 11 and 13. The calculation of inverse matrices is a routine matter. See F. B. Hildebrand, *Methods of Applied Mathematics*, Prentice-Hall 1952, Library of Congress card No. 52–9880. Such an inverse matrix may be employed as diagrammatically represented in FIG. 1, matrix 20 having paths 25–28 and dynamic compensating functions 25a–28a to correspond with the paths 15–18 and functions 15a–18a of process 10, but providing for inverse modification of the valve actuation signals.

To illustrate the operation of the inverse matrix modification of the valve control, take the case of measurement 12, which is supplied to controller 19 deviating from set point 12a, causing controller 19 to produce a valve actuation signal 21 intended to restore measurement 12 to the desired set point valve 12a. Valve actuation signal 21 is routed through matrix 20 to valve 11 via path 25; in addition matrix 20 provides for cross-coupling via path 27 to valve 13. Function 27a in cross-coupled path 27 provides for the inverse affect upon measurement 14 as that occasioned by the process cross-coupling represented by function 17a in path 17. That is to say, from valve signal 21 to measurement 14, two paths are provided. One is the matrix 20 path 25 to valve 11, and thence through process cross-path 17 to measurement 14. The other path is matrix cross-path 27 to valve 13 and thence through process path 16 to measurement 14. These combined paths, arriving at measurement 14, provide for an over-all cancellation so that measurement 14 is not altered by the restoration of measurement 12 to set-point. Another way to put it is that matrix 20 provides for just the correct amount of manipulation of valve 13 via cross-path 27 to cancel out the effect upon measurement 14 arising from the direct manipulation of valve 11. The matrix 20 functions similarly to cancel out the effect upon measurement 12 when an attempt is made to restore measurement 14 to set point 14a by the appropriate manipulation of valve 13.

A control difficulty arises in the use of the arrangement shown in FIG. 1, when a valve 11 or 13 reaches one of its limits. The valve, upon limiting, evidences itself, mathematically speaking, as a non-linearity, altering considerably the compensation and control paths. The valve then effectively opens the path of whcih it is a part, and compensation is no longer possible for that path. Mathematically speaking, the valve non-linearity is non-invertible, and not within the province of matrix 20 to correct.

A complex switching arrangement may be incorporated with matrix 20 to disable loops no longer under control as a result of valve saturation, or to provide for emergency control of affected loops. This approach complicates the problem of control reliability, however, in addition to presenting problems of control economy.

A new approach provides for an arrangement in which the saturated valve and its non-invertable non-linear characteristic is not a part of the compensation path.

Figure 2:
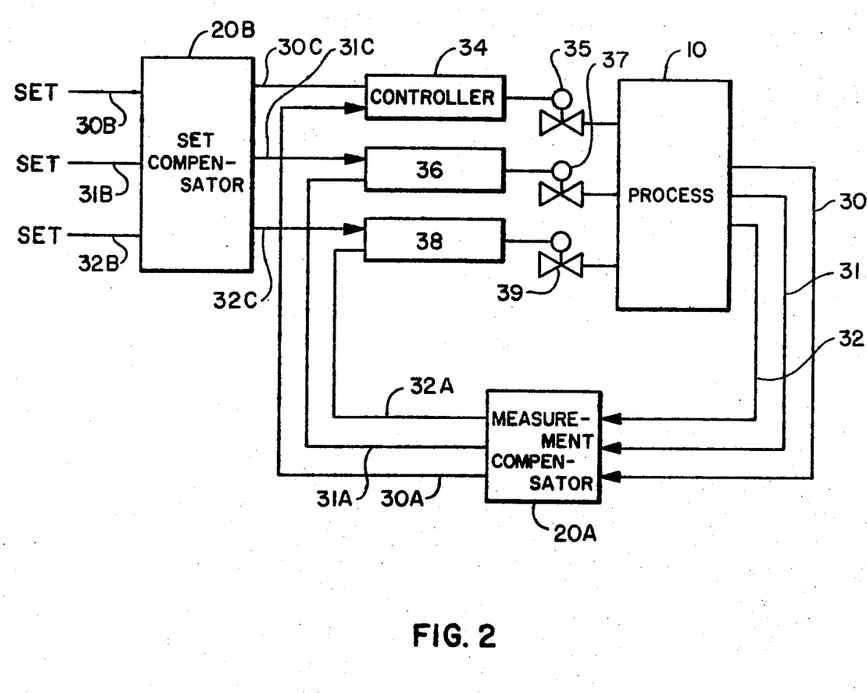
FIG. 2 is a schematic diagram of the compensation scheme of the invention having separate compensation means for the set of set points and the set of process measurements.

FIG. 2 shows three interacting control loops, for illustration, and it will be understood that each loop affects the other two loops, so that in addition to the affect consequent to actuation of valve 35 upon measurement 30, there will be also interacting affects upon measurements 31 and 32. So too, valves 37 and 39 each affect primarily respective measurements 31 and 32, but in addition interact upon the other pair of measurements as the case may be.

FIG. 2 illustrates a compensation arrangement in which there is continual compensation, under any valve situation, from process measurement 30, for example, through compensator 20a to measurement input 30a of controller 34. Controller 34 operates valve 35, which in turn primarily affects measurement 30. Should valve 35 saturate, thus opening up the control loop at that point, measurements 30, 31 and 32 still are supplied to compensator 20a, and cross-corrections are still made to provide compensated measurements 30a, 31a, and 32a.

In the arrangement of FIG. 2, since each measurement is compensated, a separate compensator 20b is provided for respective set points 30b, 31b, and 32b, so that the controller 34, for example, will have its output nulled when compensated measurement 30a is equal to compensated set point 30c.

Figure 3:
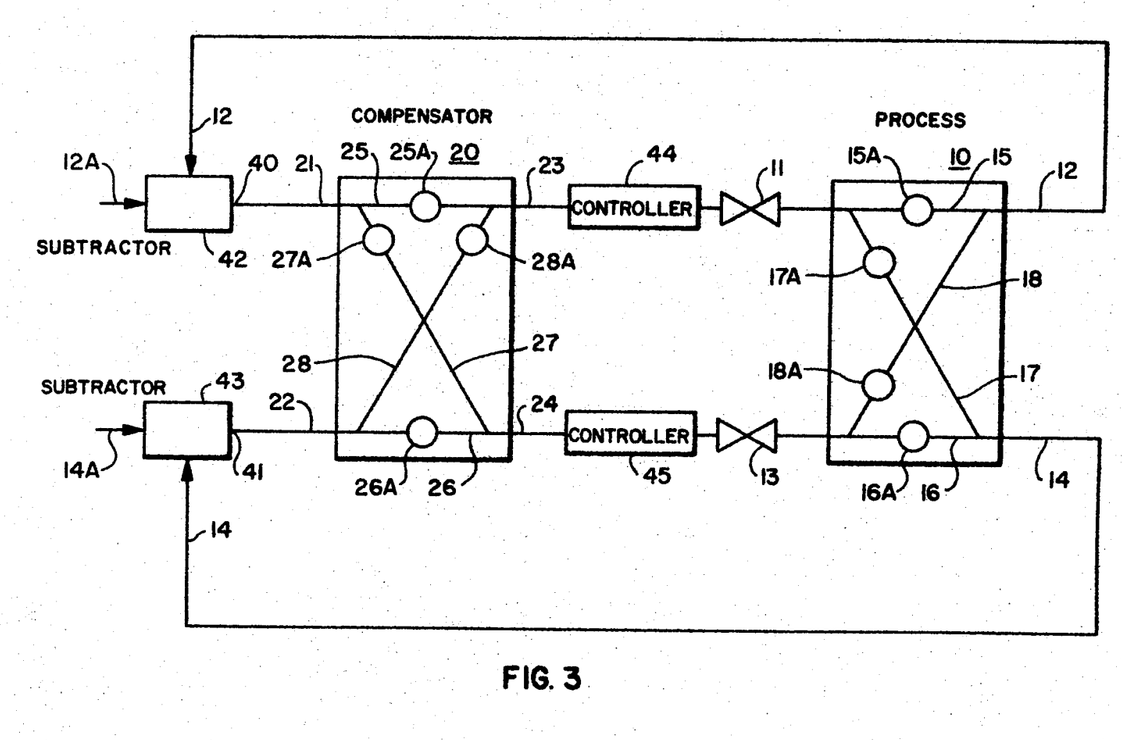
FIG. 3 is a schematic diagram of the compensation scheme of the invention having a single compensation means for processing process deviations from set points.

An alternate arrangement of FIG. 3, provides for a single compensator 20, by operating upon the deviation 40 of measurement 12 from set point 12a produced by subtractor 42, for example. Deviations 40 and 41 are processed by compensator 20 to provide cross-corrected error signals to controllers 44 and 45, respectively. Controller 44 actuates valve 11 and controller 45 actuates valve 13. A deviation in measurement 12 from set point 12a results in the production of a set of signals supplied to controllers 44 and 45 by compensator 20. The signal supplied from compensator 20 to controller 44 is a compensated error signal which actuates valve 11 to bring measurement 12 back to set point 12a. At the same time compensator 20 provides an error signal to controller 45 which in turn actuates valve 13 in a manner to off-set the cross-effect upon measurement 14 caused by interacting process 10. Thereby, measurement 12 is returned to set point 12a, while measurement 14 is stabilized by the secondary compensation signal supplied to controller 45.

In the arrangements of FIGS. 2 and 3, valve saturation means there is no longer active control of the saturated valve, but there remains a compromise control over system measurements 12 and 14. The compromise control is degraded according to the degree of process interaction. In general, in processes where all measurements are about equally important, such a compromise provides for improved process control are still as valid as before the saturation is because the compensated error signals retaining control are still as valid as before the saturation condition, inasmuch as saturation does not interrupt any of the effective compensating cross-paths in the compensator or in the process, although a path between controller output and process input becomes disabled.

Referring more specifically to the improvement effected by the arrangement of FIGS. 2 and 3, it will be seen that the system of FIG. 1 is affected by the saturation of a valve because compensator 20 operates directly upon the valves 11 and 13. Should a valve saturate, the compensation process is altered by the introduction of the valve non-linearity, However, the compensation of FIGS. 2 and 3 is always acting upon the items to be compensated, namely controllers 34, 36 and 38 in FIG. 2, or controllers 44 and 45, in FIG. 3, although one or the other controller may operate to saturate a valve at times. In FIG. 3, the improvement in control results from the optimum use of compensator 20, wherein the inputs to controllers 44 and 45 are always being compensated on the basis of the actual process measurements 12 and 14. Thus the valve limit behavior is no longer a part of the compensation paths.

Satruation results in the system losing control of one of the compensated measurements and causes a compromise degradation spread over all systems measurements which is proportioned according to degree of interaction. Where all measurements are more or less equally important this compromise is valid.

It may be noted that in practice, the compensation functions designated by the suffix "a" in the drawings comprise both static and dynamic components, illustratively 80% static and 20% dynamic, so that process interactions may be compensated for both long-term interactions and short term interacting effects.

The resulting control system permits smooth stable and safe operation over a wider range of conditions of automatic or manual control because the destabilizing effect of the valve limiting behavior is removed. And as described above, no additional hardware is required over the prior art methods.

APPENDIX

This appendix describes a simple method of calculating lead lag approximations to the dynamic inverse of a transfer function matrix. This appendix also describes generalized moment multiplication, division, addition and subtraction routines permitting a rewrite of the inversion program using the moment calculation. It then gives a modified inversion program for inverting process transfer functions together with sample uses of that program. (References for the background material are Paynter's paper on Stochastic Analogies in the Regelungtechnic coverage of the 1956 Heideberg Control conference and also Laning and Battin: Random Processes in Automatic Control (pp. 57–60). Also Horowitz: Synthesis of Feedback Systems (pp. 661–666).)

The method is based on calculations of the unnormalized moments of the impulse response $f(t)$ corresponding to each transfer function $F(s)$ where:

$$f_0 = \int f(t)dt \quad (f_0 \text{ is the gain})$$

and in general $f_n = \int t^n f(t)dt$

Note that the $f_n$ are the Taylor series coefficients $\left.\dfrac{d^n F(s)}{ds^n}\right|_{s=0}$ (except for a factor $(-)^n$) in the transform $F(s)$.)
(Conventional work with moments defines them as normalized.)

$$\mu_n = f_n/f_0$$

For any parallel (additive) combination of transfer functions $F(s)$ and $G(s)$ with moments $f_n$ and $g_n$ such that $$H(s) = F(s) + G(s)$$

and $$h_0 = \int (f(t) + g(t))dt = f_0 + g_0$$

$$h_n = \int t^n(f(t) + g(t))dt = f_n + g_n$$

If the $g_n$ are taken as being negative instead of positive this becomes substraction.
One can calculate generalized moment multiplication corresponding to the transfer function $H(s) = F(s)G(s)$ or $h(t) = \int_\infty^\infty f(\tau) g(t-\tau)d\tau$:

$$h_n = \int_{-\infty}^{\infty} t^n \int_\infty^\infty f(\tau) g(t-\tau) \, d\tau dt$$

$$= \iint t^n f(\tau) g(t-\tau)d\tau dt \quad \text{and with} \quad \lambda = t - \tau:$$

$$= \iint (\lambda + \tau)^n f(\tau) g(\lambda)d\tau d\lambda$$

$$= \iint \sum_{k=0}^{n} (k^n) \lambda^{n-k} \tau^k f(\tau) g(\lambda) \, d\tau d\lambda$$

$$= \sum_{k=0}^{n} (k^n) \int \lambda^{n-k} g(\lambda) \, d\lambda \int \tau^k f(\tau) d\tau$$

$$= \sum_{k=0}^{n} (k^n) g_{n-k} f_k = \sum_{k=0}^{n} (k^n) f_{n-k} g_k$$

If $h_0 = 1$ and $h_n = 0$ for $n > 1$ then $H(s) = 1$ and one can solve for $f_n$ in terms of $g_0 \ldots g_n$ and $f_0 \ldots f_{n-1}$ (which in turn can be expressed in the $g$'s) where $F(s)$ is then the inverse of $G(s)$ giving us a moment division operation:

$$f_0 = 1/g_0$$

$$f_n = -1/g_0 \left( \sum_{k=1}^{n} (k^n) f_{n-k} g_k \right)$$

or generally $$f_0 = h_0/g_0, \quad f_n = \dfrac{h_n - \sum_{k=1}^{n} (k) f_{n-k} g_k}{g_0}$$

The final result that is needed is some rule for translating from transfer functions to moments and back. It can be shown (integrate) that for $$F(s) = \dfrac{K}{(s+1)}, \quad f_n = K\tau^n \times n!$$

for $\quad F(s) = Ke^{-TS} \quad f_n = KT^n$ for $\quad F(s) = \tau s + 1$ $$f_0 = 1, \quad f_1 = -\tau, \quad f_n = 0 \quad \text{for} \quad n > 1$$

The moments of cascaded lags and leads can be calculated from the addition and multiplication rule.
Since the final compensation is to be taken in lead lag form:

$$F(s) = K \dfrac{\tau_1 s + 1}{\tau_2 s + 1}$$

We need a solution from the first three moments in terms of $K$, $\tau_1$, $\tau_2$. The equation for division and the moments of the lag give us three equations:

$$f_0 = K$$

$$f_1 = \left( \tau_2 \times \left( \dfrac{1}{1} \right) + (-\tau_1) \right) K = (\tau_2 - \tau_1)f_0$$

$$f_2 = (2\tau_2^2 + 2\tau_2(-\tau_1))K$$

$$= 2\tau_2(\tau_2 - \tau_1) \times K$$

$$f_3 = (6\tau_2^3 - 6\tau_2^2 \times \tau_1)K = 6\tau_2^2(\tau_2 - \tau_1)f_0$$

These can be solved:

$$K = f_0, \quad \tau_2 = \dfrac{f_2}{2f_1}, \quad \tau_1 = \dfrac{f_2}{2f_1} - \dfrac{f_1}{f_0}$$

Similarly the equation:

$$F(s) = \dfrac{K(\tau s + 1)}{as^2 + bs + 1}$$

can be solved in terms of the moments $f_0 \ldots f_3$ giving us a lead lag approximation method.

$$K = f_0, \quad b = \dfrac{f_3 f_0 - 3 f_1 f_2}{3 f_2 f_0 - 6 f_1^2}, \quad a = \dfrac{f_0 f_1 f_3 - 3 f_1^2 f_2}{3 f_2 f_0^2 - 6 f_1^2 f_0}$$

$$-\dfrac{f_2}{2 f_0}, \quad \tau = \dfrac{f_3 f_0 - 3 f_1 f_2}{3 f_2 f_0 - 6 f_1^2} - \dfrac{f_1}{f_0}$$

General solutions for ratios of polynomials in $s$ can be obtained (see Continued Fractions by Wall).

SUMMARY OF METHOD

The method consists then of the following steps:
1. Calculate moments from the open loop transfer function matrix.
2. Use a standard matrix inversion routine with all element operations replaced by the above defined operations to obtain the inverse.

3. Calculate a lead lag or lead lag-lag approximation to the inverse moments using the formulas given.

It may be advisable, where possible, to factor out any common dead time factors possible in the original matrix. Where this is not done the calculation may give rise to negative time constant (really attempts to approximate a negative dead time). One might also factor out in a diagonal matrix all diagonal elements of the original matrix before calculating. In general it is probably desirable to use a diagonal matrix factoring which minimizes the amount of dynamic compensation needed to decouple, if this can be done by eye. This places most of the burden of dynamic compensation in the controller where it is most easily tuned.

The principal advantage of this calculation is the direct approximation of lead lags through the very simple moment calculations. Since no moment calculation requires knowledge of moments of higher degree than itself the approximation simply involves lopping off the higher moments. In principle, if any order approximation is desired it can be obtained, even to the point that the exact compensation results if enough moments are calculated. In practice the lead lag calculation is good enough in most cases (although lead lag lag might be desired). But the more general algorithm is easily written. The use of moment matching has been shown by our previous experience to be an extremely effective way for computing feedforward compensations such as occur in decoupling although it is not universally good for single loop feedback stability computations.

PROGRAM DESCRIPTION

The program is in two parts:
1. The main subroutine called MOMINV which is an inversion routine written by taking the matrix inversion routine (MINV) in the IBM Scientific Subroutine package and going through it, replacing all conventional operations by moment operations.
2. A test program called CMOM which permits entry of data concerning size of the matrix and the number of moments to be carried for each entry. It then asks for entry of $K, T, D, A, B$ for each transfer function in the matrix entered in column order where the form of the transfer function is:

$$\frac{K(Ts + 1) \, \text{Exp}\,(-Ds)}{(A*s*s + B*s + 1)}$$

It then prints out the desired number of moments in the moment representation, printing in column order and printing first all the zeroth moments and all the first moments etc. It then prints the number of moments and the determinant (in moment form) followed by the inverse moment matrix in the same order as the moment matrix. Finally lead lag and lead lag lag approximations to the inverse are printed.

In using the MOMINV program note that $A$ must be dimensioned to accommodate the $m \times n$ moment matrix and $C, M$ must accommodate $n$ vectors and BIGA, HOLD and DET must accommodate a moment scalar $(f_o \ldots f_n$ for some $n)$. The printout conventions on CMOM correspond to the storage conventions of MOMINV when it is used in any other program.

Three sets of test data are included, all based on the matrix:

$$\begin{pmatrix} \dfrac{.4}{4s+1} & \dfrac{.5}{.5s+1} \\ \dfrac{.5}{.5s+1} & \dfrac{.1}{.1s+1} \end{pmatrix}$$

The true inverse of the matrix is:

$$\frac{.1(.5s+1)^2(4s+1)}{-.625s+.15} \quad \frac{-.5(4s+1)(.1s+1)(.5s+1)}{-.625s+.15}$$

$$\frac{-.5(4s+1)(.1s+1)(.5s+1)}{-.625s+.15} \quad \frac{4(.5s+1)^2(.1s+1)}{-.625s+.15}$$

If the method had been carried to give lead lead lead lag approximation the true results would be obtained. As is, the approximate results from the first run do reflect the instability. The second and third runs show the effect of negative process dead time in the calculation. The program from these runs is below.

```
            DIMENSION A(144),L(12),M(12),HOLD(12),BIGA(12),DET(12)
            WRITE(1,100)
100         FORMAT(46HINPUT NUMBER OF MOMENT MATRICES TO BE INVERTED/)
            ACCEPT 110,NMAT
            DO 120 KT=1,NMAT
1           WRITE(1,2)
2           FORMAT(///26HINPUT VALUES FOR N AND MOM/)
10          ACCEPT 60,N,MOM
            KN=N*N
            DO 200 I=1,KN
C           READ K,T,D,A,B INTO FORM (TS+1)EXP(-DS)/(A*S*S+BS+1)
            WRITE(1,250)
250         FORMAT(26HENTER VALUES FOR K,T,D,A,B/)
            ACCEPT 210,G,T,D,AI,B
```

```
210     FORMAT(5(F12.6))
        A(I)=G
        J=N*N
        K=I+J
        A(K)=G*(D-T+B)
        J1=J*2
        K1=I+J1
        A(K1)=G*D*(D-2.0*T)
        A(K1)=A(K1)+2.0*B*A(K)-G*AI
        J2=J*3
        K2=I+J2
        A(K2)=G*D**2*(D+3.0*T)
        A(K2)=A(K2)+3.0*B*A(K1)-3.0*A(K)*AI
200     CONTINUE
        KN=N*N*MOM
        WRITE(1,5)(I,A(I),I=1,KN)
5       FORMAT((2HA(,I3,2H)=,2X,F16.8/))
        CALL MOMINV(A,N,MOM,DET,L,M,HOLD,BIGA)
        WRITE(1,30)MOM,(DET(I),I=1,MOM)
30      FORMAT(4HMOM=,I3//(4HDET=,F16.8/))
        WRITE(1,40)KN,(A(I),I=1,KN)
40      FORMAT(I3//(5HINVA,F16.8))
60      FORMAT(2(I3))
110     FORMAT(I3)
120     CONTINUE
        KN=N*N
        DO 300 I=1,KN
        J=N*N
        K=I+J
        J1=J*2
        K1=I+J1
        J2=J*3
        K2=I+J2
        WRITE(1,220)I,A(I),K,A(K)
        WRITE(1,225)K1,A(K1),K2,A(K2)
220     FORMAT(2HA(,I3,2H)=,F12.6,2X,2HA(,I3,2H)=,F12.6)
225     FORMAT(2HA(,I3,2H)=,F12.6,2X,2HA(,I3,2H)=,F12.6/)
        F0=A(I)
        F1=A(K)
        F2=A(K1)
        F3=A(K2)
        G=F0
        T1=F2/(2.0*F1)-F1/F0
        T2=F2/(2.0*F1)

WRITE(1,230)G,T1,T2
230     FORMAT(2HK=,F12.6,2X,3HT1=,F12.6,2X,3HT2=,F12.6/)
        TAU=(F3*F0-3.0*F1*F2)/(3.0*F2*F0-6.0*F1**2)-(F1/F0)
        AO=(F0*F1*F3-3.0*F1**2*F2)/(3.0*F2*F0**2-6.0*F1**2*F0)
        AO=AO-(F2/(2.0*F0))
        BO=(F3*F0-3.0*F1*F2)/(3.0*F2*F0-6.0*F1**2)
        WRITE(1,240)G,TAU,AO,BO
240     FORMAT(2HK=,F12.6,2X,2HT=,F12.6,2X,2HA=,F12.6,2X,2HB=F12.6/)
300     CONTINUE
        END

JOB CORRECT

M←
```

```
C
C      PURPOSE:
C      INVERT A MOMENT MATRIX
C
C      USAGE:
C      CALL MOMINV (A,N,MOM,D,L,M,HOLD,BIGA)
C
C      DESCRIPTION OF PARAMETERS:
C      A - INPUT MATRICES,ONE FOR EACH MOMENT,DESTROYED
C      IN COMPUTATION AND REPLACED BY RESULTANT INVERSE
C      N - ORDER OF EACH MATRIX A
C      D - RESULTANT DETERMINANTS
C      L - WORK VECTOR OF LENGTH N
C      WORK VECTOR OF LENGTH N
C      MOM - NUMBER OF MOMENTS
C      HOLD - USED TO HOLD INTERIM VALUES OF A
C      BIGA - USED TO FIND AND CONTAIN PIVOT ELEMENTS
C
C      REMARKS:
C      THIS SUBROUTINE IS FROM THE IBM SUBROUTINE MINV-
C      MODIFIED TO PERFORM TRANSFER FUNCTION INVERSION
C      BY THE METHOD OF MOMENTS
C
       SUBROUTINE MOMINV(A,N,MOM,D,L,M,HOLD,BIGA)
       DIMENSION A(1),L(1),M(1),HOLD(1),BIGA(1),D(1)
C
C      SEARCH FOR LARGEST ELEMENT
C
       D(1)=1.0
       DO 299 IM=2,MOM
299    D(IM)=0.0
       NK=-N
       DO 80 K=1,N
       NK=NK+N
       L(K)=K
       M(K)=K
       KK=NK+K
       DO 320 IM=1,MOM
       KKK=KK+N*N*(IM-1)
320    BIGA(IM)=A(KKK)
       DO 20 J=K,N
       IZ=N*(J-1)
       DO 20 I=K,N
       IJ=IZ+I
10     IF(ABS(BIGA(1))-ABS(A(IJ)))15,20,20
15     DO 321 IM=1,MOM
       KKK=IJ+N*N*(IM-1)
321    BIGA(IM)=A(KKK)
       L(K)=I
       M(K)=J
20     CONTINUE
C
C      INTERCHANGE ROWS
C
       J=L(K)
       IF(J-K)35,35,25
25     KI=K-N
       DO 30 I=1,N
       KI=KI+N
       DO 300 IM=1,MOM
       KKI=KI+N*N*(IM-1)
```

```
300     HOLD(IM)=-A(KKI)
        JI=KI-K+J
        DO 301 IM=1,MOM
        KKI=KI+N*N*(IM-1)
        JJI=JI+N*N*(IM-1)
301     A(KKI)=A(JJI)
        DO 302 IM=1,MOM
        JJI=JI+N*N*(IM-1)
302     A(JJI)=HOLD(IM)
30      CONTINUE
C
C       INTERCHANGE COLUMNS
C
35      I=M(K)
        IF(I-K)45,45,38
38      JP=N*(I-1)
        DO 40 J=1,N
        JK=NK+J
        JI=JP+J
        DO 303 IM=1,MOM
        JJK=JK+N*N*(IM-1)
303     HOLD(IM)=-A(JJK)
        DO 304 IM=1,MOM
        JJK=JK+N*N*(IM-1)
        JJI=JI+N*N*(IM-1)
304     A(JJK)=A(JJI)
        DO 305 IM=1,MOM
        JJI=JI+N*N*(IM-1)
305     A(JJI)=HOLD(IM)
40      CONTINUE
C
C       DIVIDE COLUMN BY MINUS PIVOT (VALUE OF
C       PIVOT ELEMENT IS CONTAINED IN BIGA)
C
45      IF(BIGA(1))48,46,48
46      D(1)=0.0
        RETURN
48      DO 55 I=1,N
        IF(I-K)50,55,50
50      IK=NK+I
        A(IK)=A(IK)/(-BIGA(1))
        DO 306 IM=2,MOM
        IIK=IK+(IM-1)*N*N
        SUM=A(IIK)/(-BIGA(1))
        B1=1
        B2=1
        DO 307 IR=2,IM
        IFLT=(IM-1)-(IR-1)+1
C       NOTE THE EXPLICIT USE OF THE FLOAT FUNCTION
        B1=B1*FLOAT(IFLT)
        B2=B2*FLOAT(IR-1)
        IIK=IK+((IM-1)-(IR-1))*N*N
307     SUM=SUM-(B1/B2)*((A(IIK)*BIGA(IR))/BIGA(1))
        IIK=IK+(IM-1)*N*N
306     A(IIK)=SUM
55      CONTINUE
C
C       REDUCE MATRIX
C
        DO 65 I=1,N
        IK=NK+I
        IJ=I-N
```

```
          DO 65 J=1,N
          IJ=IJ+N
          IF(I-K)60,65,60
60        IF(J-K)62,65,62
62        KJ=IJ-I+K
          A(IJ)=A(IK)*A(KJ)+A(IJ)
          DO 308 IM=2,MOM
          IIJ=IJ+(IM-1)*N*N
          IIK=IK+(IM-1)*N*N
          SUM=A(IIK)*A(KJ)
          B1=1
          B2=1
          DO 309 IR=2,IM
          IFLT=(IM-1)-(IR-1)+1
          B1=B1*FLOAT(IFLT)
          B2=B2*FLOAT(IR-1)
          IIK=IK+((IM-1)-(IR-1))*N*N
          KKJ=KJ+(IR-1)*N*N
309       SUM=SUM+(B1/B2)*A(IIK)*A(KKJ)
308       A(IIJ)=SUM+A(IIJ)
65        CONTINUE
C
C         DIVIDE ROW BY PIVOT
C
          KJ=K-N
          DO 75 J=1,N
          KJ=KJ+N
          IF(J-K)70,75,70
70        CONTINUE
          A(KJ)=A(KJ)/BIGA(1)
          DO 310 IM=2,MOM
          KKJ=KJ+(IM-1)*N*N
          SUM=A(KKJ)/BIGA(1)
          B1=1
          B2=1
          DO 311 IR=2,IM
          IFLT=(IM-1)-(IR-1)+1
          B1=B1*FLOAT(IFLT)
          B2=B2*FLOAT(IR-1)
          KKJ=KJ+((IM-1)-(IR-1))*N*N
311       SUM=SUM-(B1/B2)*((A(KKJ)*BIGA(IR))/BIGA(1))
          KKJ=KJ+(IM-1)*N*N
310       A(KKJ)=SUM
75        CONTINUE
C
C         PRODUCT OF PIVOTS
C
          D(1)=D(1)*BIGA(1)
          DO 322 IM=2,MOM
          SUM=D(IM)*BIGA(1)
          B1=1
          B2=1
          DO 323 IR=2,IM
          IIM=IM-IR+1
          B1=B1*FLOAT(IIM)
          B2=B2*FLOAT(IR-1)
323       SUM=SUM+(B1/B2)*D(IIM)*BIGA(IR)
322       D(IM)=SUM
C
C         REPLACE PIVOT BY RECIPROCAL
C
          A(KK)=1.0/BIGA(1)
          DO 312 IM=2,MOM
```

```
            B1=1
            B2=1
            SUM=0.0
            DO 313 IR=2,IM
            IFLT=(IM-1)-(IR-1)+1
            B1=B1*FLOAT(IFLT)
            B2=B2*FLOAT(IR-1)
            KKK=KK+((IM-1)-(IR-1))*N*N
313         SUM=SUM-(B1/B2)*A(KKK)*BIGA(IR)/BIGA(1)
            KKK=KK+(IM-1)*N*N
312         A(KKK)=SUM
80          CONTINUE
C
C     FINAL ROW AND COLUMN INTERCHANGE
C
            K=N
100         K=K-1
            IF(K)150,150,105
105         I=L(K)
            IF(I-K)120,120,108
108         JQ=N*(K-1)
            JR=N*(I-1)
            DO 110 J=1,N
            JK=JQ+J
            DO 314 IM=1,MOM
            JJK=JK+N*N*(IM-1)
314         HOLD(IM)=A(JJK)
            JI=JR+J
            DO 315 IM=1,MOM
            JJK=JK+N*N*(IM-1)
            JJI=JI+N*N*(IM-1)
315         A(JJK)=-A(JJI)
            DO 316 IM=1,MOM
            JJI=JI+N*N*(IM-1)
316         A(JJI)=HOLD(IM)
110         CONTINUE
120         J=M(K)
            IF(J-K)100,100,125
125         KI=K-N
            DO 130 I=1,N
            KI=KI+N
            DO 317 IM=1,MOM
            KKI=KI+N*N*(IM-1)
317         HOLD(IM)=A(KKI)
            JI=KI-K+J
            DO 318 IM=1,MOM
            KKI=KI+N*N*(IM-1)
            JJI=JI+N*N*(IM-1)
318         A(KKI)=-A(JJI)
            DO 319 IM=1,MOM
            JJI=JI+N*N*(IM-1)
319         A(JJI)=HOLD(IM)

130         CONTINUE
            GO TO 100
150         RETURN
            END

JOB CORRECT

M←
```

We claim:

1. An improved system for the control of interacting process variables of the type having, for each variable,
   sensing means for generating a measurement signal related to the value of the variable,
   error signal means responsive to the sensing means for generating an error signal related to the difference between the value of the variable and a set point value,
   control signal means responsive to the error signal means for generating a control signal based on the error signal,
   process control means responsive to the control signal for varying the variable,
   wherein the improvement comprises:
      interaction compensation means for modifying the error signal supplied to the control signal means to compensate for the static and dynamic effects of interaction between the process variables.

2. The control system of claim 1 wherein the compensation means modifies the error signal generated by the error signal means to compensate for the static and dynamic effects of interaction between the first and second variables.

3. The control system of claim 1 wherein the compensation means comprises:
   measurement compensation means for modifying the measurement signals supplied to the error signal means to compensate for the static and dynamic effects of interaction between the first and second variables, and
   set point compensation means for modifying the set point values utilized by the error signal means to compensate for the effects of modifying the measurement signals.

4. The control system of claim 1 wherein the compensation means comprises:
   means for generating signals related to the inverse of the effects of interaction between the first and second variables.

5. The method of compensating a multiloop set point control system for the effects of interaction between the controlled process variables comprising:
   compensating the inputs to an individual control loop from the process to compensate for the effects of interaction of other control loops.

6. The method of claim 5 wherein the compensation step comprises:
   generating an error signal related to the difference between the present value of a controlled variable in the loop and a desired set point value, and
   compensating the error signal by a factor related to the inverse of the effects of interaction of other control loops upon the compensated loop.

7. The method of claim 5 wherein the compensation step comprises:
   compensating a measurement signal related to the present value of a controlled variable in the loop for the effects of interaction of other control loops,
   compensating a set point signal related to the desired value of the measurement signal for the effect of compensating the measurement signal, and
   generating a compensated error signal related to the difference between the compensated measurement signal and the compensated set point signal.

8. The method of claim 5 wherein the compensation is performed according to a factor related to the inverse of the effects of interaction between the control loops.

* * * * *